US012060698B2

(12) United States Patent
Wood (10) Patent No.: US 12,060,698 B2
(45) Date of Patent: Aug. 13, 2024

(54) ATMOSPHERIC WATER HARVESTING APPARATUS

(71) Applicant: Ryan S. Wood, Broomfield, CO (US)

(72) Inventor: Ryan S. Wood, Broomfield, CO (US)

( * ) Notice: Subject to any disclaimer, the term of this patent is extended or adjusted under 35 U.S.C. 154(b) by 388 days.

(21) Appl. No.: 17/685,233

(22) Filed: Mar. 2, 2022

(65) Prior Publication Data

US 2022/0282461 A1    Sep. 8, 2022

Related U.S. Application Data

(60) Provisional application No. 63/207,459, filed on Mar. 3, 2021.

(51) Int. Cl.
| | |
|---|---|
| *B01D 53/26* | (2006.01) |
| *B01D 53/32* | (2006.01) |
| *B03C 3/30* | (2006.01) |
| *B03C 3/36* | (2006.01) |
| *E03B 3/28* | (2006.01) |

(52) U.S. Cl.
CPC .............. *E03B 3/28* (2013.01); *B01D 53/26* (2013.01); *B01D 53/323* (2013.01); *B03C 3/30* (2013.01); *B03C 3/368* (2013.01); *B03C 2201/24* (2013.01)

(58) Field of Classification Search
CPC .......... B01D 53/26; B01D 53/32; B03C 3/30; B03C 3/36; E03B 3/28
See application file for complete search history.

(56) References Cited

U.S. PATENT DOCUMENTS

| | | | |
|---|---|---|---|
| 5,330,559 A | 7/1994 | Cheney | |
| 8,206,494 B2 * | 6/2012 | Galbrun | .................... B03C 3/32 96/96 |

OTHER PUBLICATIONS

Reznikov, Michael et al. "Further Progress in the Electrostatic Nucleation of Water Vapor." IEEE Transactions on Industry Applications 54 (2018): 591-598.
Tapuchi, Saad et al. "Obtaining fresh water from atmosphere using electrostatic precipitation: theory, efficiency and limitations." 2010.
Childs, Peter. Rotating Cylinders, Annuli, and Spheres. 2011.
Tu, Yaodong et al. "Progress and Expectation of Atmospheric Water Harvesting", CellPress Reviews, Aug. 15, 2018.
Zou, H., Zhang, Y., Guo, L. et al. Quantifying the triboelectric series. Nat Commun 10, 1427, 2019.

* cited by examiner

*Primary Examiner* — Sharon Pregler (57) ABSTRACT

An atmospheric water harvesting apparatus includes a post, a water capturing unit, a drive bearing, a motor, a water collecting member, and a power source. The water capturing unit comprises a cylindric wall. The cylindric wall is positioned concentrically with the post. The cylindric wall comprises an inner surface and an outer surface. The cylindric wall forms an air passageway having an air inlet and an air outlet. The inner surface of the cylindric wall is coated with a layer of triboelectric material. The drive bearing is rotatably mounted about the post. The drive bearing is provided with a plurality of radial bars. The water collecting member is located beneath the water capturing unit to collect water captured by the water capturing unit. The power source is electrically connected to the motor.

20 Claims, 9 Drawing Sheets

ATMOSPHERIC WATER HARVESTING APPARATUS

FIELD OF THE INVENTION

The present invention relates generally to water harvesting from the atmosphere. More specifically, the present invention is an apparatus for harvesting water from surrounding air. The present invention provides improved energy efficient extraction of water from air, particularly in outdoor settings and over a range of relative humidity.

BACKGROUND OF THE INVENTION

Worldwide, the shortage of freshwater has increased exponentially due to population growth, climate change and contamination of available water, especially in water tables that provide water for general consumption. There are vast regions of Africa, India, and the Pacific Ocean where there is real water scarcity.

Over the 20th century and into the 21st century, the global population has increased by 300%, while water consumption has increased by 600%. Freshwater is becoming a scarce commodity as climate change, man-made pollutants entering the water system, and over-withdrawal of existing aquifers place enormous strain on freshwater supplies. The distribution of freshwater around the globe is highly uneven, leading to regional shortages or excesses of water resources. Based on the Falkenmark Stress Indicator (FSI) index, the United Nations has predicted that 48 countries will experience water stress or scarcity by 2025. Four billion people in the world face at least one month of water scarcity every year. The water crisis has or will soon turn into food crisis in many areas of the world. To avert the looming water-food crisis, certain measures should be adopted, including, but not limited to i) water conservation, ii) reducing pollutants entering the water system, iii) upgrading current infrastructure, and iv) improving freshwater generation technologies. With an estimated 12,800 trillion liters of renewable water available in the atmosphere, atmospheric water harvesting has the potential to be a viable solution to address some of the global needs for freshwater, especially in locations where even saline and/or brackish water is not available. Combining these facts and considering the challenges and shortcomings of existing centralized water provision and delivery systems, the idea of decentralized atmospheric water harvesting (AWH) systems has emerged and been followed by a number of researchers and manufacturers during the last few decades. A conventional AWH operates using vapor compression refrigeration (VCR) unit to condensate water from ambient air by cooling it below its dew point temperature.

However, several drawbacks are associated with the existing AWH systems. For example, the existing AWH systems are expensive to manufacture, and/or are not conducive to operation in arid climates, and/or are not suitable for reliable production of potable water in significant quantities, and/or cannot be implemented in compact units, and/or require large amounts of energy per quantity of water produced, and/or have geographical location requirements.

Therefore, it is an objective of the present invention to provide an atmospheric water harvesting apparatus that overcomes the problems set forth above.

SUMMARY OF THE INVENTION

The present invention discloses an atmospheric water harvesting apparatus that comprises a post, a water capturing unit, a drive bearing, a motor, a water collecting member, and a power source. The post comprises a first end and a second end. The water capturing unit comprises a cylindric wall. The cylindric wall is positioned concentrically with the post. The cylindric wall comprises an inner surface and an outer surface. The cylindric wall forms an air passageway having an air inlet and an air outlet. The inner surface of the cylindric wall is coated with a layer of triboelectric material. The drive bearing is rotatably mounted about the post. The drive bearing is provided with a plurality of radial bars. Each of the plurality of radial bars comprises a proximal end connected to the drive bearing and a distal end attached to the inner surface of the cylindric wall. The motor is mounted adjacent to the drive bearing to rotatably drive the drive bearing about the post. The water collecting member is located beneath the water capturing unit to collect water captured by the water capturing unit. The power source is electrically connected to the motor.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of atmospheric water harvesting apparatuses, embodiments of the present disclosure are not limited to use only in this context.

The present invention is an atmospheric water harvesting apparatus that is designed to harvest water from air. It is an aim of the present invention to provide an efficient, low-cost atmospheric water harvesting apparatus that can operate virtually anywhere including low humidity or arid areas. It is another aim of the present invention to provide an atmospheric water harvesting apparatus that is simple in structure, inexpensive to manufacture, and easy to use. It is another aim of the present invention to provide a compact atmospheric water harvesting apparatus that only occupies a small footprint.

Figure 1:
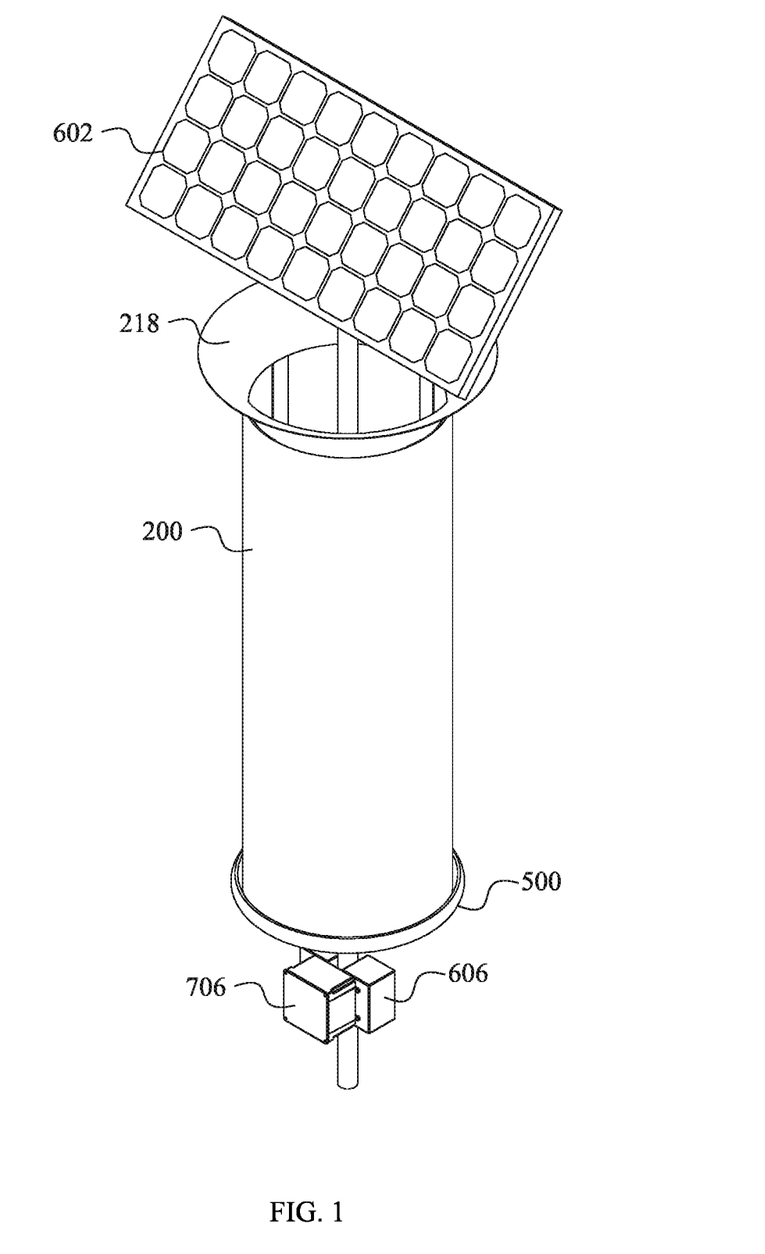
FIG. 1 depicts a perspective view of the present invention.

Referring now to the figures of the present disclosure. FIG. 1 is a perspective view of the present invention. The atmospheric water harvesting apparatus of the present invention comprises a post 100, a water capturing unit 200, a drive bearing 300, a motor 400, a water collecting member 500, and a power source 600.

The post 100 is configured to install thereto the components of the present invention. It should be noted that the post 100 can be of any shape, size, material, features, type or kind, orientation, location, quantity, components, and arrangements of components that would allow the present invention to fulfill the objectives and intents of the present invention. In a preferred embodiment, the post 100 is a cylindric post comprising a first end 102 and a second end 104. In one embodiment, the second end 104 of the post 100 may be fixed to ground with the post 100 being vertically oriented. In another embodiment, the post 100 may comprise a wire guiding member 120 having at least one aperture 122 formed therethrough. Preferably, the wire guiding member 120 is located above the water capturing unit 200.

In reference to FIGS. 1-4, the water capturing unit 200 is configured for electrostatic precipitation of moisture in the air. The efficiency of electrostatic precipitation (or Electrostatic Water Air Nucleation) of water from the air has been theoretically analyzed and the inherent limitations are known. Water drops below a certain minimum size cannot be extracted from the air since they either cannot be charged, or their charge is insufficient for precipitation. Values of the minimal and effective radiuses of drops have been analytically determined. Enlarging the drops is proposed to increase the efficiency of precipitation. Another key aspect of the improved precipitation efficiency is the centrifugal force of the water capturing unit 200 that flings the small water droplets toward the high static field on the wall of the water capturing unit 200. The combination of The key principles of electrostatic precipitation for moisture in the air comprises three main independent stages:

Ionization of air molecules;

Charging of water drops in the air by the ion;

Centrifugal force that flings water outward; and

Precipitation of the water drops using a static electric field.

One of the most effective methods of ionization and subsequent charging of the particles in the air is the use of crown (or corona) discharge. This method involves passing the gas in between ionized electrodes. When the atoms or molecules meet the surface of the metal electrodes, they lose or gain a charge subject to the polarity of the electrode. The electric field density must be as high as a few kV/m to initiate ionization.

The water capturing unit 200 of the present invention may comprise a cylindric wall 202. The cylindric wall 202 may be positioned concentrically with the post 100. The cylindric wall 202 may be conductive and may have a charge thereon so as to enhance the attraction of the charged water droplets. The cylindric wall 202 may comprise an inner surface 204 and an outer surface 206. In one embodiment, the cylindric wall 202 of the water capturing unit 200 forms an air passageway 210 having an air inlet 212 and an air outlet 214. Preferably, the air inlet 212 is located at the top of the cylindric wall 202, while the air outlet 214 is located at the bottom of the cylindric wall 202. The inner surface 204 of the cylindric wall 202 is preferably coated with a layer of triboelectric material 216. The cylindric wall 202 is able to rotate about the post 100 by means of the drive bearing 300, which will be described in more detail hereinafter. In an alternative embodiment, the post 100, instead of the cylindric wall 202, may be rotated by the motor 400. The cylindric wall 202 may be made of any suitable material. Preferably, the cylindric wall 202 is made of sailcloth, waterproof fabric, polyvinyl chloride, or aluminum.

Figure 4:
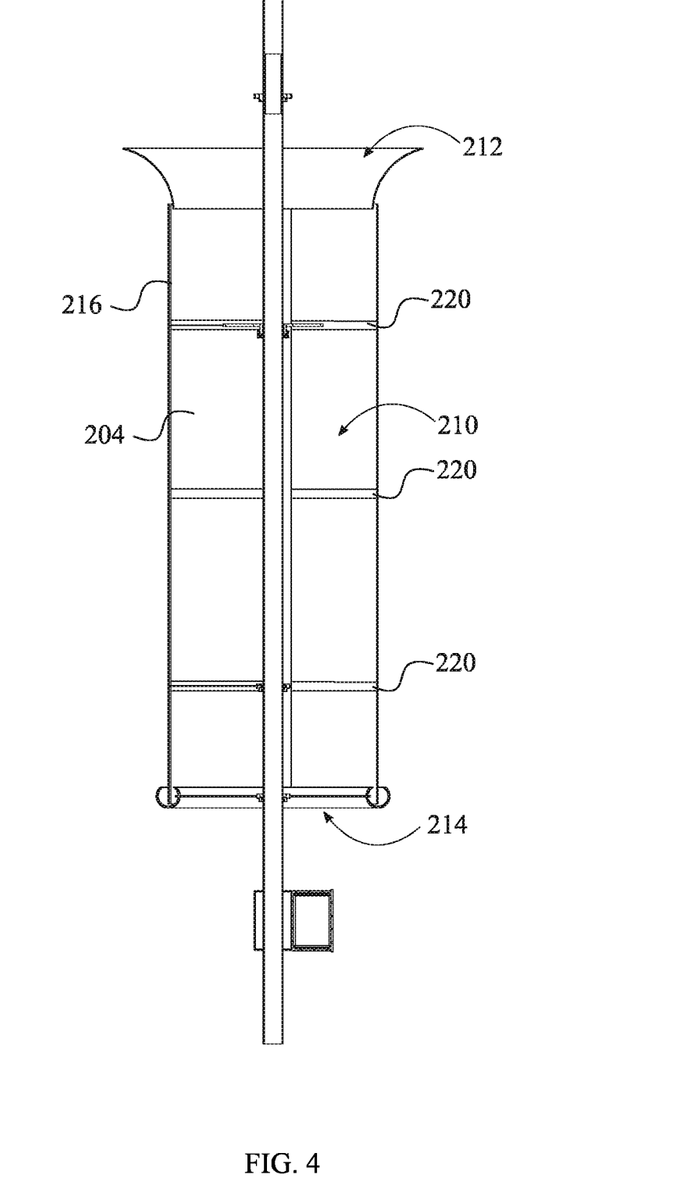
FIG. 4 depicts a cross-sectional view of the present invention, taken along line A-A in FIG. 3.

The cylindric wall 202 of the present invention creates a high static electricity potential between the interior of the cylindric wall 202 and the outer surface 206 of the cylindric wall 202. This is caused by the friction of the rotating cylindric wall 202 with the air and the optimization of high negative turboelectric materials. The rotation of the cylindric wall 202 initially moves water microdroplets in the air passageway 210 outwards. The water microdroplets are consolidated into bigger droplets that accelerate toward the inner surface 204 of the cylindric wall 202. Then the bigger droplets hit the inner surface 204 of the cylindric wall 202 and are captured by the layer of triboelectric material 216 coated on the inner surface 204 of the cylindric wall 202.

Air coming from the air inlet 212 goes down the inner surface 204 of the cylindric wall 202 with a large velocity differential to the inner surface 204 of the cylindric wall 202. In a preferred embodiment, air can be sucked in via an air suction device (e.g., a fan, etc.), which may be attached to the air inlet 212 of the air passageway 210. Friction with inner surface 204 of the cylindric wall 202 causes the air to match the high static potential inner rotating surface velocity, such that the same friction triboelectrically charges the inner surface 204 of the cylindric wall 202. The charged inner surface 204 acts upon the incoming water droplets so that the water droplets are rapidly attracted to the inner surface 204 of the cylindric wall 202. Moreover, due to gravitation, the water droplets will bead up and move down to the bottom of the cylindric wall 202. To facilitate water collection, the inner surface 204 can be coated with a hydrophobic coating. The hydrophobic coating may be disposed on the layer of triboelectric material 216.

The cylindric wall 202 can also be electrically charged to further enhance the triboelectric effect. This can be implemented via a fine wire mesh embedded in the cylindric wall 202 such that the charge can be tuned up or down via the microcontroller 700 based on atmospheric conditions and available power.

The triboelectric material may be any suitable triboelectric material. Preferably, the triboelectric material is also hydrophobic. For example, the triboelectric material may be polyvinyl chloride (PVC) or polytetrafluoroethylene (Teflon). Other examples of triboelectric material may include but not limited to Chemical-resistant Viton® fluor elastomer rubber, Acetal, Flame-retardant garolite, Garolite G-10, Clear cellulose, Abrasion-resistant polyurethane rubber, Acrylonitrile butadiene styrene, Clear polycarbonate, Polystyrene, Ultem polyetherimide, Polydimethylsiloxane, Polyester fabric, Polyimide film, Polyvinylidene fluoride, Polyetheretherketone, Polyethylene, High-temperature silicone rubber, Wear-resistant garolite, High impact polystyrene, Weather-resistant EPDM rubber, Leather strip, Oil-filled cast nylon 6, Clear cast acrylic, Silicone, Abrasion-resistant SBR rubber, Noryl polyphenyl ether, Poly (phenylene sulfide), Polypropylene, Slippery nylon 66, Polysulfone, Cast nylon 6, Delrin® acetal resin, Marine-grade Plywood, Wear-resistant slippery garolite, Oil-resistant buna-N rubber, Food-grade oil-resistant buna-N/Vinyl rubber, Super-stretchable and abrasion-resistant natural rubber, Chemical-resistant and low-temperature fluorosilicone rubber, Chemical- and steam-resistant aflas rubber, Weather- and chemical-resistant santoprene rubber, Duralar polyester film, Easy-to-machine electrical-insulating garolite, Food-grade high-temperature silicone rubber.

In reference to FIG. 4, the cylindric wall 202 may comprise at least one circular batten 220 to reinforce the cylindric wall 202. The circular batten 220 may be built in the cylindric wall 202 or attached to the inner surface 204 or outer surface 206 of the cylindric wall 202. In a preferred embodiment, the cylindric wall 202 may comprise at least one vertical rib 222 to help water droplet flow down to the bottom of the cylindric wall 202. The at least one vertical rib 222 may also be built in the cylindric wall 202 or attached to the inner surface 204 or outer surface 206 of the cylindric wall 202. In a preferred embodiment, the diameter to height ratio of the cylindric wall 202 may range from 1:3 to 1:8. For instance, the cylindric wall 202 may be 1 meter in diameter and 3-8 meters in height. In another preferred embodiment, the water capturing unit 200 further comprises a flared inlet duct 218 attached to the cylindric wall 202, preferably at the air inlet 212, in order to reduce air pressure and facilitate air intake. In one embodiment, the air suction device may be attached to the flared inlet duct 218.

Figure 5:
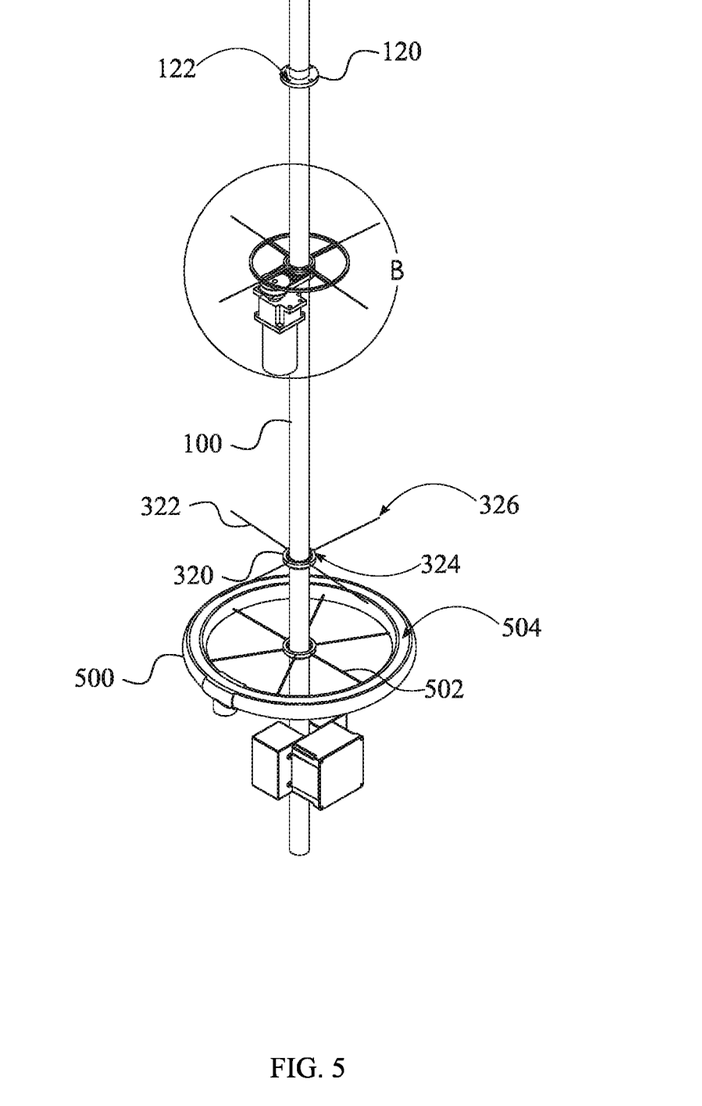
FIG. 5 depicts a perspective view of the present invention, wherein the solar panel and the water capturing unit are removed.
Figure 6:
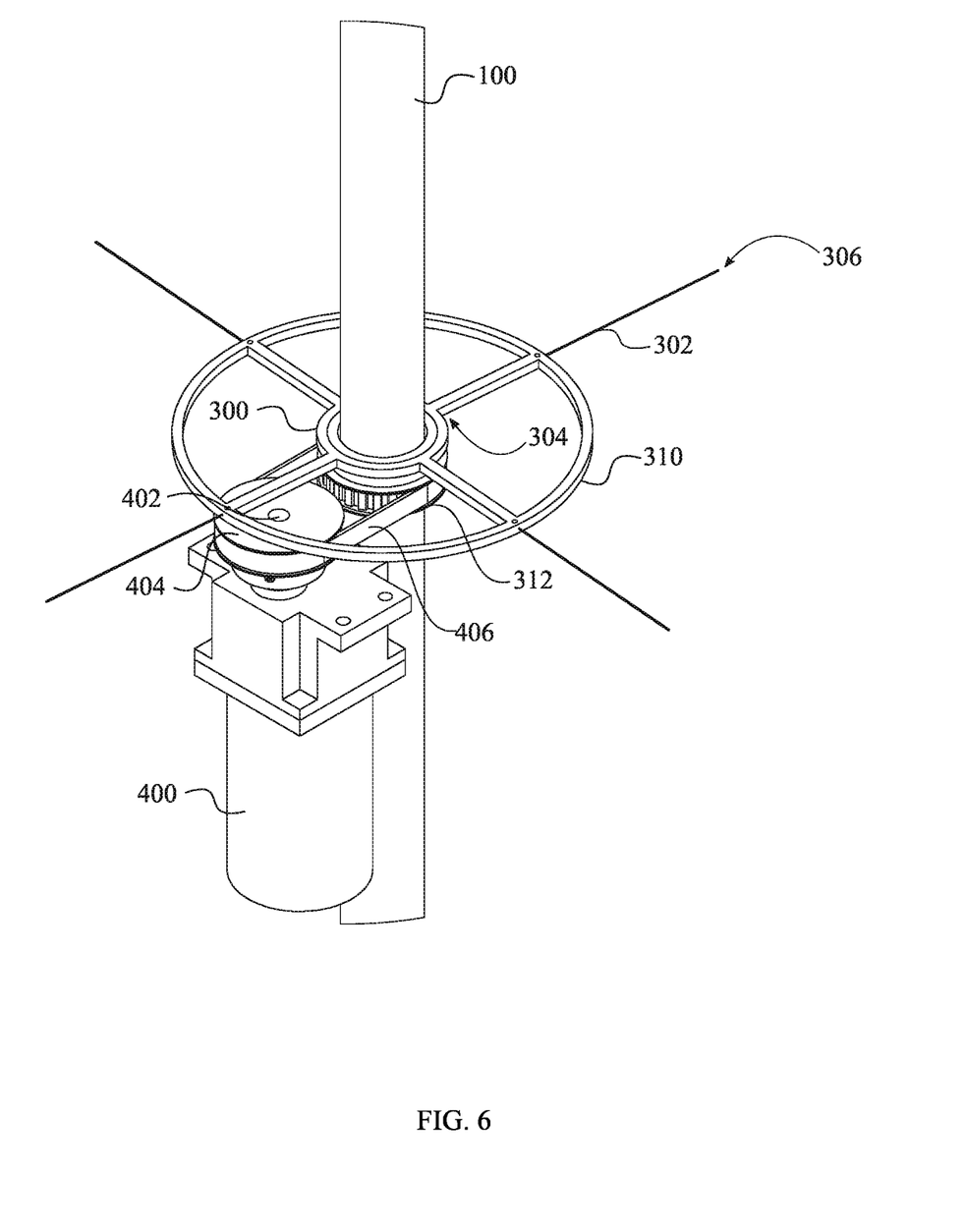
FIG. 6 depicts a close-up view of area B in FIG. 5.

In reference to FIGS. 5 and 6, the drive bearing 300 is configured to rotate the water capturing unit 200. The drive bearing 300 may be rotatably mounted about the post 100. Further, the drive bearing 300 may be provided with a plurality of radial bars or wires 302. Each of the plurality of radial bars 302 may comprise a proximal end 304 connected to the drive bearing 300 and a distal end 306 attached to the inner surface 204 of the cylindric wall 202. In a preferred embodiment, the distal end 306 of each of the plurality of radial bars 302 is attached to the circular batten 220 of the cylindric wall 202. This will facilitate improving the stability and stiffness of the apparatus when the water capturing unit 200 is rotated at a relatively high speed (e.g., 500-4,000 rpm). In another preferred embodiment, the drive bearing 300 further comprises a circular hub member 310. The circular hub member 310 may be positioned concentrically with the drive bearing 300. The plurality of radial bars 302 travels through the circular hub member 310 to enhance the structural integrity. Therefore, when the drive bearing 300 is rotated, the plurality of radial bars 302 will cause the water capturing unit 200 to rotate about the post 100.

In a preferred embodiment, the atmospheric water harvesting apparatus of the present invention further comprises an idle bearing 320. The idle bearing 320 may be similar to the drive bearing 300 in structure. Particularly, the idle bearing 320 may be provided with a plurality of radial bars 322. Each of the plurality of radial bars 322 may comprise a proximal end 324 connected to the idle bearing 320 and a distal end 326 attached to the inner surface 204 of the cylindric wall 202. In a preferred embodiment, the distal end 326 of each of the plurality of radial bars 302 is attached to the circular batten 220 of the cylindric wall 202. Preferably, the idle bearing 320 is located adjacent to the air outlet 214 of the air passageway 210, while the drive bearing 300 is located adjacent to the air inlet 212 of the air passageway 210. Although only one idle bearing 300 is illustrated in the drawings, it should be noted that more than one idle bearing 300 may be utilized.

The drive bearing 300 is preferably driven by the motor 400. In one embodiment, the motor 400 may be mounted below the drive bearing 300 to rotatably drive the drive bearing 300 about the post 100. The motor 400 may be mounted onto the post 100 via any suitable mechanisms (e.g., U-bolt mounting bracket, etc.). The motor 400 provided can be a brushed motor or a brushless motor either AC or DC. In a preferred embodiment, the motor 400 drives the drive bearing 300 via a belt-pulley power transmission system. In this system, the motor 400 comprises a driving pulley 404 attached to an output shaft 402 of the motor 400, and the drive bearing 300 comprises a driven pulley 312 attached thereto. An endless belt 406 is wound around the driving pulley 404 and the driven pulley 312. The endless belt 406 is tensioned such that the rotation of the driving pulley 404 can be transmitted to the driven pulley 312 via the endless belt 406.

Figure 7:
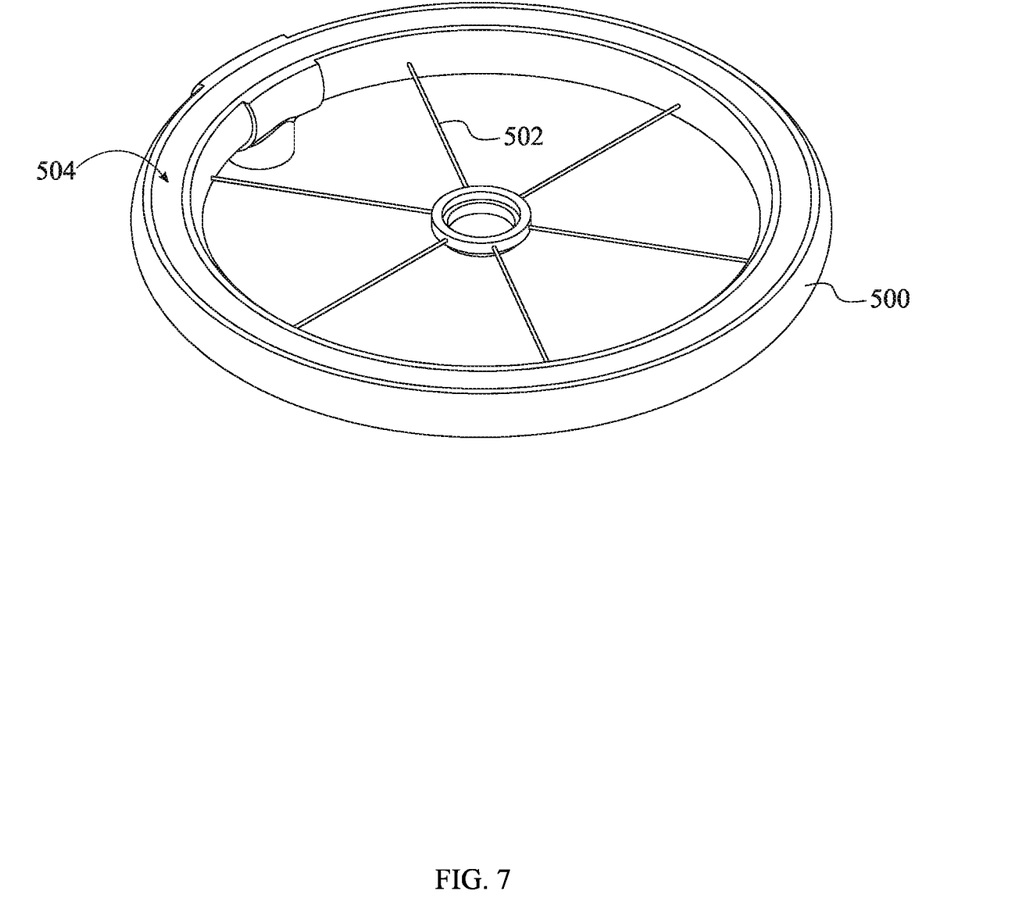
FIG. 7 depicts a top perspective view of the water collecting rim of the present invention.
Figure 8:
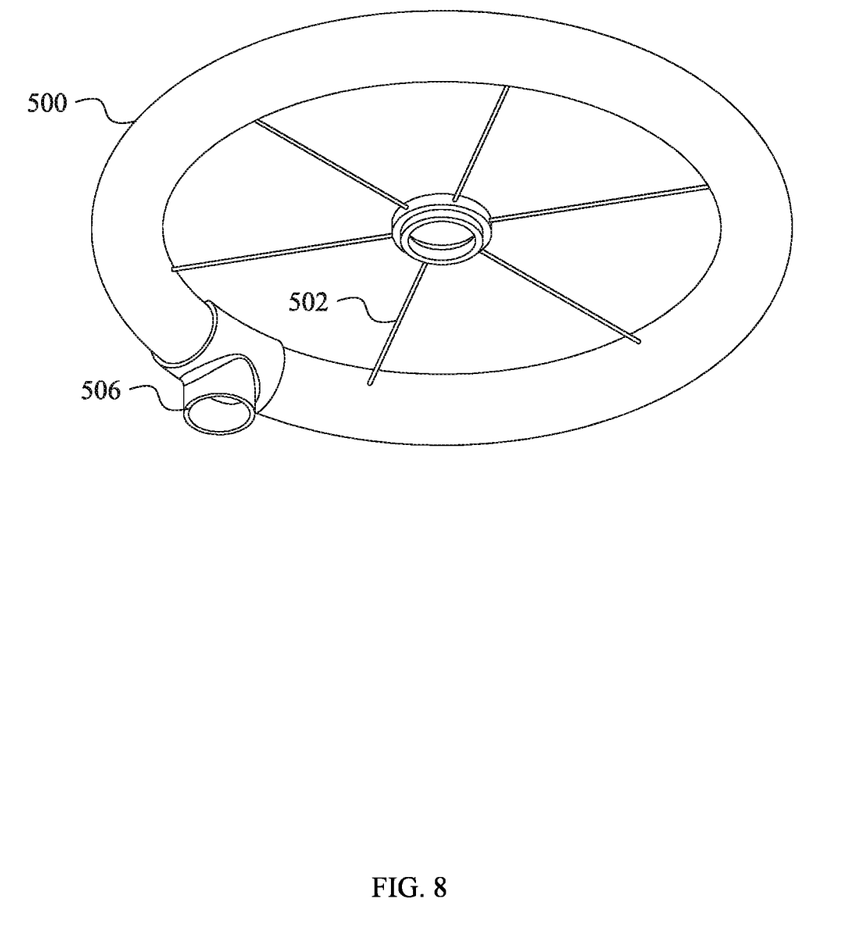
FIG. 8 depicts a bottom perspective view of the water collecting rim of the present invention.

In reference to FIGS. 7 and 8, the water collecting member 500 is configured to collect the water captured by the water capturing unit 200. Preferably, the water collecting member 500 is a circular member concentrically connected to the post 100. In one embodiment, the water collecting member 500 is connected to the post 100 via a plurality of radial bars 502. In one embodiment, the water collecting member 500 comprises a circumferential groove 504. The bottom edge of the cylindric wall 202 may be located inside the circumferential groove 504, such that the water captured by the water capturing unit 200 is collected in the circumferential groove 504. The water collecting member 500 may further comprise a water outlet 506 that is in fluid communication with the circumferential groove 504. The collected water may be directed to a storage device (e.g., a bucket, a tank, etc.) via the water outlet 506.

Figure 2:
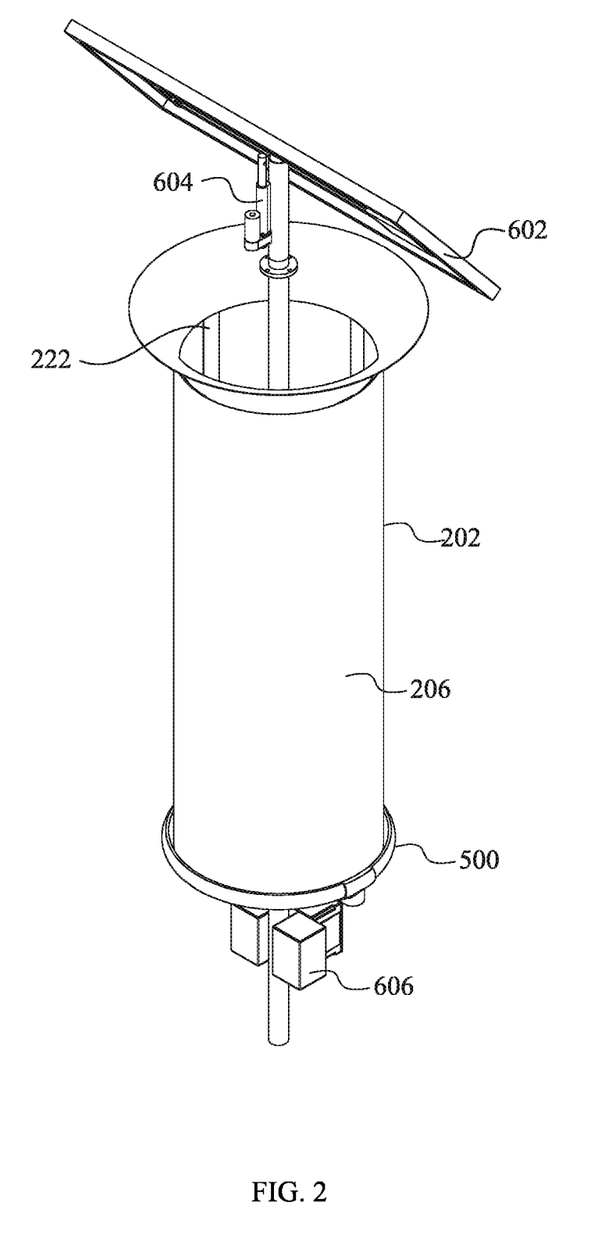
FIG. 2 depicts another perspective view of the present invention.
Figure 3:
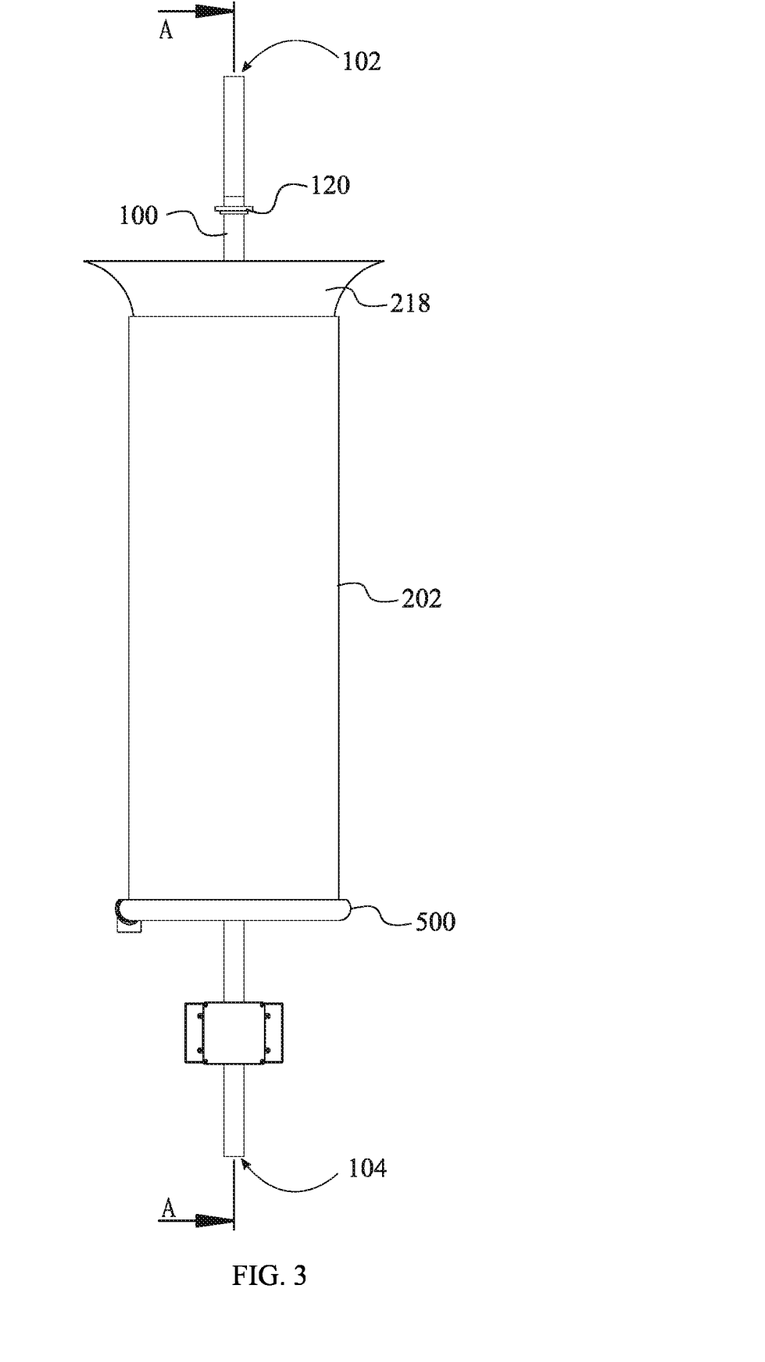
FIG. 3 depicts a front view of the present invention, wherein the solar panel is removed.

The power source 600 can be any type of power source, including a battery, a direct current (DC) voltage source, a wind turbine, a solar panel, a fuel cell, or any other type of power source. Preferably, the power source comprises a solar panel 602, as shown in FIGS. 1 and 2. Preferably, the solar panel 602 is mounted at the first end 102 of the post 100. In one embodiment, the present invention further comprises a linear actuator 604. The linear actuator 604 may be mounted to the post 100, adjacent to the first end 102 of the post 100. The linear actuator 604 is connected to the solar panel 602 to adjust a tilt angle of the solar panel 602. The solar panel 602 may be electrically connected to the motor 400 to directly supply power thereto. Alternatively, the solar panel 602 may be electrically connected to one or more energy storage devices 606 (e.g., rechargeable batteries, etc.) for transmitting the electric energy generated by the solar panel 602 to the energy storage device for later use.

Figure 9:
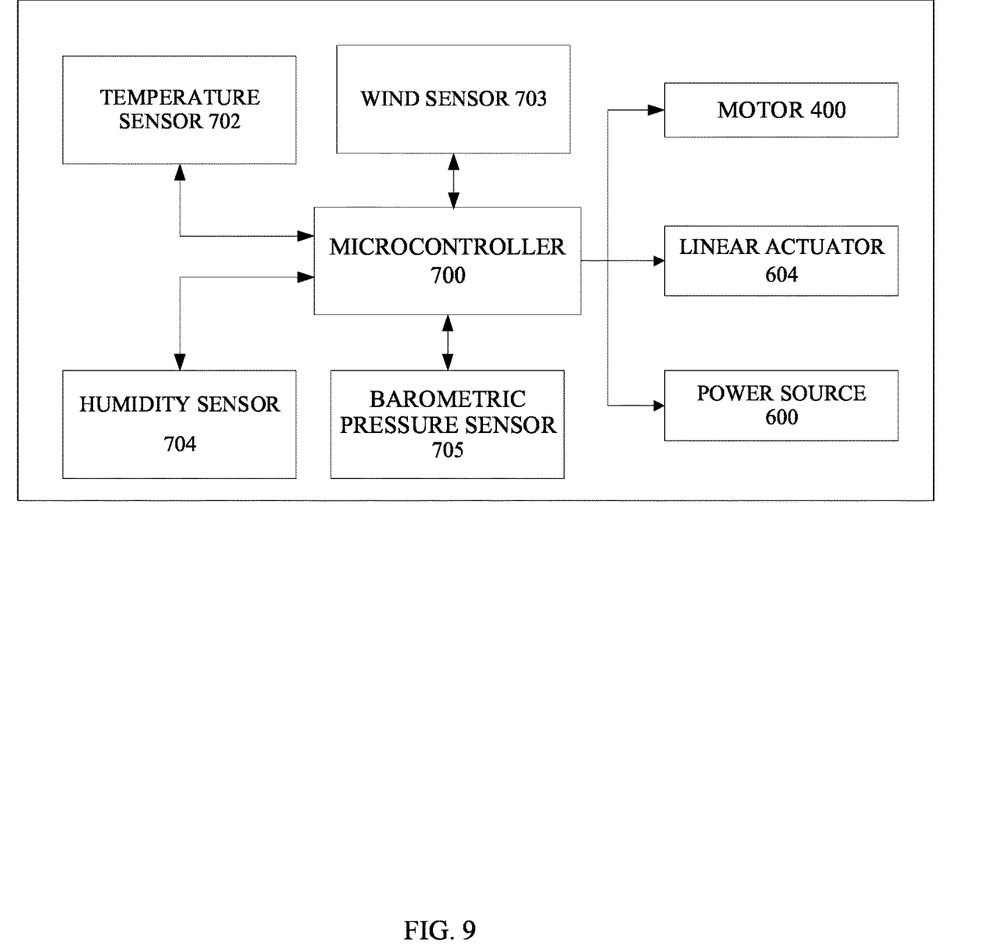
FIG. 9 depicts a block view of the control system of the present invention.

Now referring to FIG. 9, which illustrates the control system of the present invention. The abovementioned components of the present invention are preferably controlled by the control system to work typically during the late evening and early morning, in order to ensure maximum water extraction from higher humidity atmosphere. Specifically, the present invention may comprise a microcontroller 700 that is electrically connected to the linear actuator 604 and the motor 400. Moreover, the present invention may comprise a temperature sensor 702 and a humidity sensor 704. In a preferred embodiment, the present invention further comprises a wind sensor 703 and a barometric pressure sensor 705. The sensors may transmit collected data to the microcontroller 700. The microcontroller 700 may be configured to adjusts a rotation speed of the motor 400 based on the data collected from the temperature sensor 702, the wind sensor 703, the humidity sensor 704, and/or the barometric pressure sensor 705. The microcontroller 700 may be enclosed in a control box 706. In one embodiment, the microcontroller 700 may be connected to an external device (e.g., a desktop computer, a laptop computer, a server, a cellphone, etc.) via a wired or wireless network, such that the atmospheric water harvesting apparatus of the present invention can be controlled remotely. Moreover, the microcontroller 700 may control the operation of the present invention in accordance with weather forecasts. In one embodiment, any radio signal can serve as inputs to the microcontroller 700 in order to control the apparatus of the present invention.

It is envisioned that the sizes of the components forming the present invention such as the post 100, the water capturing unit 200, the water collecting member 500, etc. can vary based on design requirements. Additionally, a plurality of the atmospheric water harvesting apparatuses can be grouped into clusters and work independently or in tandem.

Although the disclosure has been explained in relation to its preferred embodiment, it is to be understood that many other possible modifications and variations can be made without departing from the spirit and scope of the disclosure.

What is claimed is:

1. An atmospheric water harvesting apparatus, comprising:
   a post;
   a water capturing unit;
   a drive bearing;
   a motor;
   a water collecting member;
   a power source;
   the post comprising a first end and a second end;
   the water capturing unit comprising a cylindric wall;
   the cylindric wall being positioned concentrically with the post;
   the cylindric wall comprising an inner surface and an outer surface;
   the cylindric wall forming an air passageway;
   the air passageway comprising an air inlet and an air outlet;
   the inner surface of the cylindric wall being coated with a layer of triboelectric material;
   the drive bearing being rotatably mounted about the post;
   the drive bearing being provided with a plurality of radial bars;

each of the plurality of radial bars comprising a proximal end connected to the drive bearing and a distal end attached to the inner surface of the cylindric wall;

the motor being mounted adjacent to the drive bearing to rotatably drive the drive bearing about the post;

the water collecting member being located beneath the water capturing unit to collect water captured by the water capturing unit; and the power source being electrically connected to the motor.

2. The atmospheric water harvesting apparatus as claimed in claim 1, wherein the triboelectric material is polyvinyl chloride or polytetrafluoroethylene.

3. The atmospheric water harvesting apparatus as claimed in claim 1, wherein the water capturing unit further comprises a flared inlet duct attached to the cylindric wall.

4. The atmospheric water harvesting apparatus as claimed in claim 1, further comprising:
at least one circular batten;
the least one circular batten being attached to the cylindric wall; and
the distal end of each of the plurality of radial bars being attached to one of the at least one circular batten.

5. The atmospheric water harvesting apparatus as claimed in claim 4, further comprising at least one vertical rib.

6. The atmospheric water harvesting apparatus as claimed in claim 5, wherein the cylindric wall is made of sailcloth, waterproof fabric, polyvinyl chloride, or aluminum.

7. The atmospheric water harvesting apparatus as claimed in claim 1, further comprising:
a circular hub member;
the circular hub member being positioned concentrically with the drive bearing; and
each of the plurality of radial bars traveling through the idle bearing.

8. The atmospheric water harvesting apparatus as claimed in claim 7, further comprising:
an idle bearing;
the idle bearing being located adjacent to the air outlet of the air passageway;
the idle bearing being provided with a plurality of radial bars;
each of the plurality of radial bars of the idle bearing comprising a proximal end connected to the idle bearing and a distal end attached to the inner surface of the cylindric wall.

9. The atmospheric water harvesting apparatus as claimed in claim 8, wherein the drive bearing is mounted adjacent to the air inlet of the air passageway.

10. The atmospheric water harvesting apparatus as claimed in claim 9, wherein the motor is mounted onto the post and below the drive bearing.

11. The atmospheric water harvesting apparatus as claimed in claim 1, further comprising:
a driving pulley;
a driven pulley;
an endless belt;
the driving pulley being attached to an output shaft of the motor;
the driven pulley being attached to the drive bearing; and
the endless belt being wound around the driving pulley and the driven pulley.

12. The atmospheric water harvesting apparatus as claimed in claim 1, wherein the water collecting member comprises a circumferential groove.

13. The atmospheric water harvesting apparatus as claimed in claim 12, further comprising:
the water collecting member further comprising a water outlet;
the water outlet being located at a bottom of the water collecting member; and
the water outlet being in fluid communication with the circumferential groove.

14. The atmospheric water harvesting apparatus as claimed in claim 1, wherein the power source comprises a solar panel.

15. The atmospheric water harvesting apparatus as claimed in claim 14, wherein the solar panel is mounted at the first end of the post.

16. The atmospheric water harvesting apparatus as claimed in claim 15, further comprising:
a linear actuator;
the linear actuator being mounted on the post; and
the linear actuator being connected to the solar panel to adjust a tilt angle of the solar panel.

17. The atmospheric water harvesting apparatus as claimed in claim 16, further comprising:
a microcontroller; and
the microcontroller being electrically connected to the linear actuator and the motor.

18. The atmospheric water harvesting apparatus as claimed in claim 17, further comprising:
a temperature sensor;
a humidity sensor;
a wind sensor;
a barometric pressure sensor; and
the microcontroller being configured to adjust a rotation speed of the motor based on data collected from one or more of the temperature sensor, the humidity sensor, the wind sensor, and the barometric pressure sensor.

19. The atmospheric water harvesting apparatus as claimed in claim 1, further comprising:
a wire guiding member;
the wire guiding member comprising at least one aperture formed therethrough; and
the wire guiding member being located above the water capturing unit.

20. The atmospheric water harvesting apparatus as claimed in claim 1, wherein the inner surface is further coated with a hydrophobic coating.

* * * * *